US008363574B2

(12) United States Patent
Longobardi et al.

(10) Patent No.: US 8,363,574 B2
(45) Date of Patent: Jan. 29, 2013

(54) MONITORING PARTICIPANTS IN A CONFERENCE CALL

(75) Inventors: Giuseppe Longobardi, Rome (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 12/483,659

(22) Filed: Jun. 12, 2009

(65) Prior Publication Data

US 2009/0310770 A1  Dec. 17, 2009

(30) Foreign Application Priority Data

Jun. 12, 2008 (FR) .................................... 08 158156

(51) Int. Cl.
*H04L 12/16* (2006.01)
(52) U.S. Cl. ..................... 370/260; 709/204; 379/202.01
(58) Field of Classification Search ............. 379/202.01; 370/260; 709/204
See application file for complete search history.

(56) References Cited

U.S. PATENT DOCUMENTS

| 7,023,965 | B2 | 4/2006 | Oates |
| 2005/0149876 | A1 | 7/2005 | Kortum et al. |
| 2006/0067499 | A1 | 3/2006 | Oliveira et al. |
| 2008/0222536 | A1* | 9/2008 | Berstis et al. ................. 715/753 |
| 2008/0240392 | A1* | 10/2008 | Berstis et al. ............. 379/202.01 |
| 2009/0220063 | A1* | 9/2009 | Miller et al. ............. 379/202.01 |
| 2009/0319920 | A1* | 12/2009 | Kortum et al. ................. 715/755 |

FOREIGN PATENT DOCUMENTS

WO   WO2007131824 A1   11/2007

* cited by examiner

*Primary Examiner* — Creighton Smith
(74) *Attorney, Agent, or Firm* — Brevetto Law Group (57) ABSTRACT

Embodiments monitor the participation of remote users to conference calls even when they are connected through simple telephone, i.e. without multimedia (or Internet) connection. In particular, an embodiment enables callers to monitor an up to date list of participants without the need of using a dedicated phone or connecting through a PC and a dedicated line to a central Conference Call system. This can be highly useful in case of travelling users who are expected to join the call from different places. Embodiments may not need a complex network infrastructure or network protocol change, since the information about the participant list can be transmitted over the normal phone line using a predetermined set of signals (e.g. an acoustic signal). Both the Conference Call server and the peripheral devices may refer to the same set of signals. Embodiments may be transparent to those users who do not wish to (or cannot) use the new functionality.

23 Claims, 5 Drawing Sheets

MONITORING PARTICIPANTS IN A CONFERENCE CALL

RELATED APPLICATIONS

This application is based on and claims the benefit of priority from European Patent 08158156.3, filed Jun. 12, 2008.

TECHNICAL FIELD

This disclosure relates to the field of telephone communications and more particularly to monitoring participants to a telephone call with multiple users.

BACKGROUND

In large companies located in different Regions it is becoming a common practice to use conference calls to have different parties participating in virtual meetings by connecting to conference call facilities. This is sometimes also applicable and effective for people located in the same town, but at different company buildings, to avoid the need to find a conference room and to move several people around the buildings. Usually there is a conferencing number which is related to a centralized communication apparatus, possibly located in a place that is remote from all the call participant locations. For example the conference call facility system may be located in New York and the call participants are located in Los Angeles (Calif.), Rome (Italy), Austin (Tex.) and may be calling from different kind of places: e.g. the own office, a customer office, from home, from any public space like hotels, airports, train stations, own cars and so on. When the number of participants is high, it is difficult to understand who has dialled in, joining the call. This information may be available at the central location where the conferencing system facility is located, but it may be not available to all the remote locations and to all the participants. In most cases it is important for who set the meeting to know who dialled in. There is normally a tone announcing that someone has just dialled in and it is usual practice to ask "Who has just joined?". The meeting moderator manually can keep track of the names to know if all expected parties are in and to write down the participants list in the meeting minutes at the end. This information is also important for all the attendees, in order to know who is connected on the other side of the phones and is listening/participating. Now if you are among the first people connecting, you hear all the moderator identifications requests and you may manually get the same participants list, but if you are one of the last dialling in or if you arrive when the call has already started, you might miss this kind of information.

SUMMARY

Embodiments are provided for monitoring a plurality of participants to a conference call in a system including a server and a plurality of peripheral units, each peripheral unit being adapted to connect with the server by means of a telephone line and being adapted to detect acoustic tones, each peripheral unit storing a list of predetermined acoustic tones, each tone being indicative of one of the participants the method including the steps of: starting a conference call; responsive to a participant joining the call, the server issuing to the plurality of peripheral units an acoustic tone indicative of the participant; responsive to the detection of the issued acoustic tone each peripheral unit updating a list of currently connected participants.

An embodiment provides for improving the participation of remote users to conference calls even when they are connected through simple telephone, i.e. without multimedia (or Internet) connection. In particular, an embodiment enables callers to monitor an up to date list of participants without the need of using a dedicated phone or connecting through a PC and a dedicated line to a central Conference Call system. This can be highly useful in case of travelling users who are expected to join the call from different places. Also an embodiment does not need a complex network infrastructure or network protocol change, since the information about the participant list can be transmitted over the normal phone line using a predetermined set of signals (e.g. an acoustic signal). Both the Conference Call server and the peripheral devices may refer to the same set of signals. The methods are transparent to those users who do not wish to (or cannot) use the new functionality. Also, in an embodiment, each user connected by phone does not require an additional network connection and a connected graphical device (like a PC) to get the participants info from the central system.

BRIEF DESCRIPTION OF THE DRAWINGS

Embodiments of the invention are herein described by way of example only, with reference to the accompanying drawings in which.

DETAILED DESCRIPTION

Figure 1:
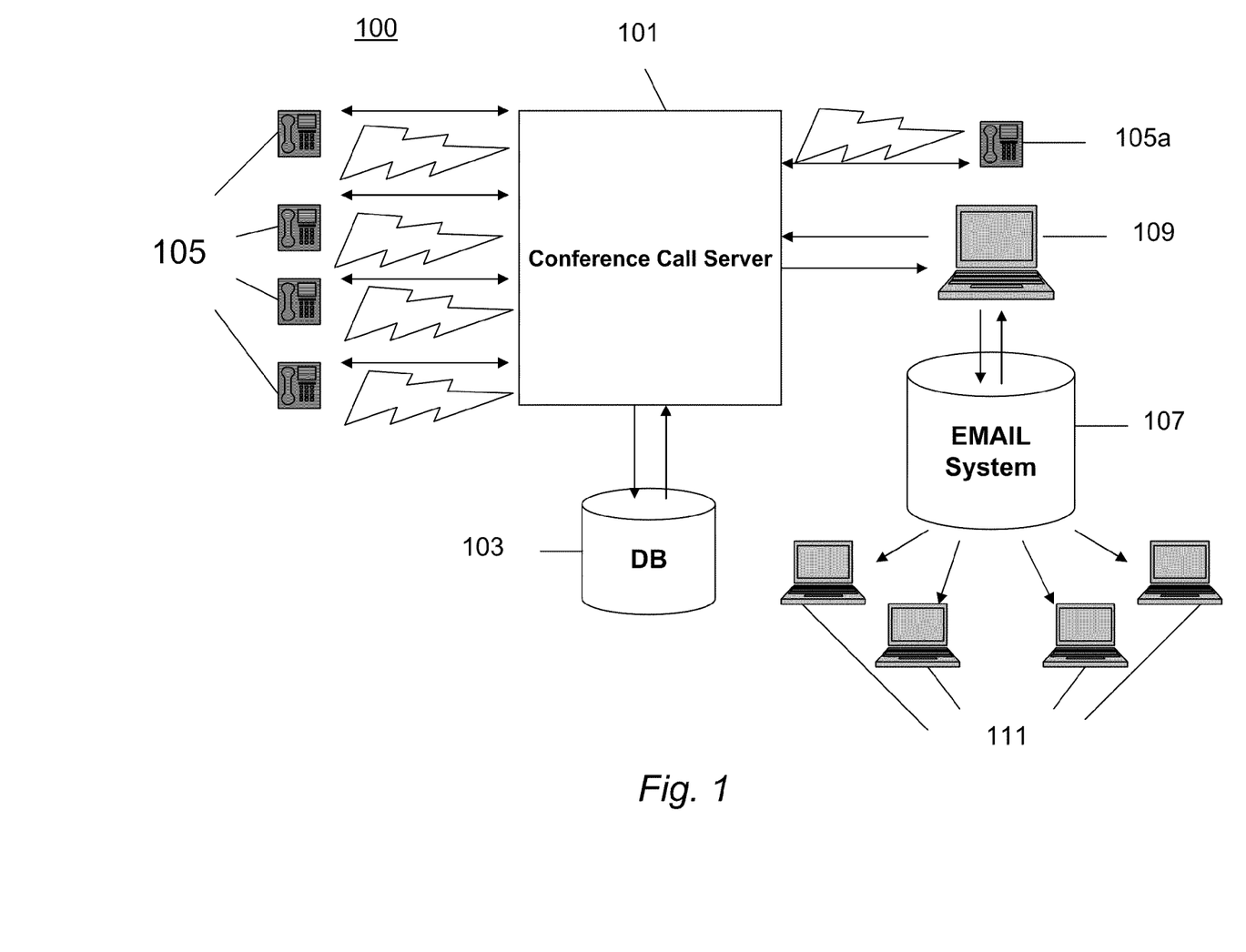
FIG. 1 is a block diagram of the architecture of the system of an embodiment.

According to an embodiment of the invention we provide a way to allow participants to monitor the list of people that dialled in and that is participating to a conference call. In an embodiment a conference call facility system may receive the participant list and associates, according to a predetermined order, a different acoustical signal (different in frequency and in tone for example) to be played to announce the call joining. In an embodiment a simple device (that is capable to be connected to a PC via USB, or wireless connection) may be able to download the participants list together with the associated tones, and may be able to detect the different acoustical tones. The device may associate the joining tone to a specific participant according to a predetermined table and may show on a local display the list of connected users, which may update when a new call participant can be detected. This list may be locally saved in storage and then may be uploaded on PC for further processing, via USB for example, if needed. Once the participants list can be stored in the device, the device may be used anywhere and no PC (and PC connection) may be required. Moreover a manual input may also be provided (by using a small keyboard, like the one present in a cellular phone, or a simulated one with a sliding cursor that enables to select a letter) to enter the participants list. Anyway, if the list is not available on the device, and it is only on paper for example, the user may still be able to retrieve the info: for example by reading on the display that e.g. the participant number 4 dialled in, he can manually go through the participants list and may be able to retrieve the name. The device may have many different embodiments, e.g. it could be a small device with dimensions comparable to a cellular phone or to a MP3 reader. Another possibility can be to modify existing phone (either mobile phone or normal wired phone) to provide the HW and software capability necessary to recognize and process the acoustic signal received by the Conference Call server. Many existing smart phones already include HW components which can be used to implement embodiments of the invention and only the suitable SW may be necessary. Referring to FIG. 1, the system 100 may comprise a Conference Call Server 101 connected to a database 103. The database may collect information about the participants list and their details (e.g. name, location, telephone number) and may be used by the Server 101 when handling connections to the Conference Call by authorized or subscribed users. Server 101 can be a dedicated server, but may be embedded in a bigger communication system possibly integrating telephone and data lines. A plurality of users 105 can connect to the Server 101 by means of telephone lines of various different types, e.g. wire lines, GSM, Voice-over-IP lines. One of them 105a may be the organizer (or moderator) of the conference call and normally has the responsibility to start the call.

An Email messaging system 107 can be used to set up the conference and can be used to advise the participants of the calling info. According to an embodiment, an Email system 107 may communicate with server 101 through an Email server 109 and may have a plurality of users 111 communicating with the Email server 107 and among each other. The Email system 107 may notify the Conference call Server 101 (for example by using an Email alias) of the conference call scheduling and provides the list of the participants (for example extracting them from the TO and CC in the Email or from an attached flat file). In an embodiment, the user may manually provide the list of participants to the Conference Call Server 101. According to an embodiment the Email system 107 could be implemented by Lotus Notes of International Business Machines Corporation. The name of the participants can be extracted from the TO and CC fields present in the conference call invitation Email which could be also sent to a special Email ID of the conferencing system. The field TO and CC are well known and standard fields of the SMTP protocol (the first included in the RCPT TO command and the second in the body with header Cc, part of the DATA command). However other system could also be used, e.g. Outlook Express of Microsoft. The same standard fields of the SMTP protocol can be extracted and used to define the participants list. Once the participants list has been prepared and stored (either manually and/or automatically) into the Server 101, each participant may be associated to a specific acoustic signal according to a predetermined order (order of subscription or alphabetical order, just as an example). These identification signals may be stored in the server 101 (they can be acoustic signals, multimedia files, e.g. Mp3, WAV, WMA). The identification signals can be stored on the remote device as well. The set of signals may be periodically refreshed or changed, provided that the remote devices and the central conferencing server are in synch and hold the same set in order to properly work.

In an embodiment, the order of the participants list may be the same as retrieved from the invitation Email. The order of the acoustic tones in the tones list may be fixed, so that the first in the caller participants list gets always the first acoustic tone from the tones list. This fixed association (the first in the participants list corresponds to the first in the acoustic signals list) could guarantee a standard and known association between participants and tones used by this system. It is understood that any order and association may be equally good, the only requirement being the agreement between the server 101 and the users 105.

Figure 2:
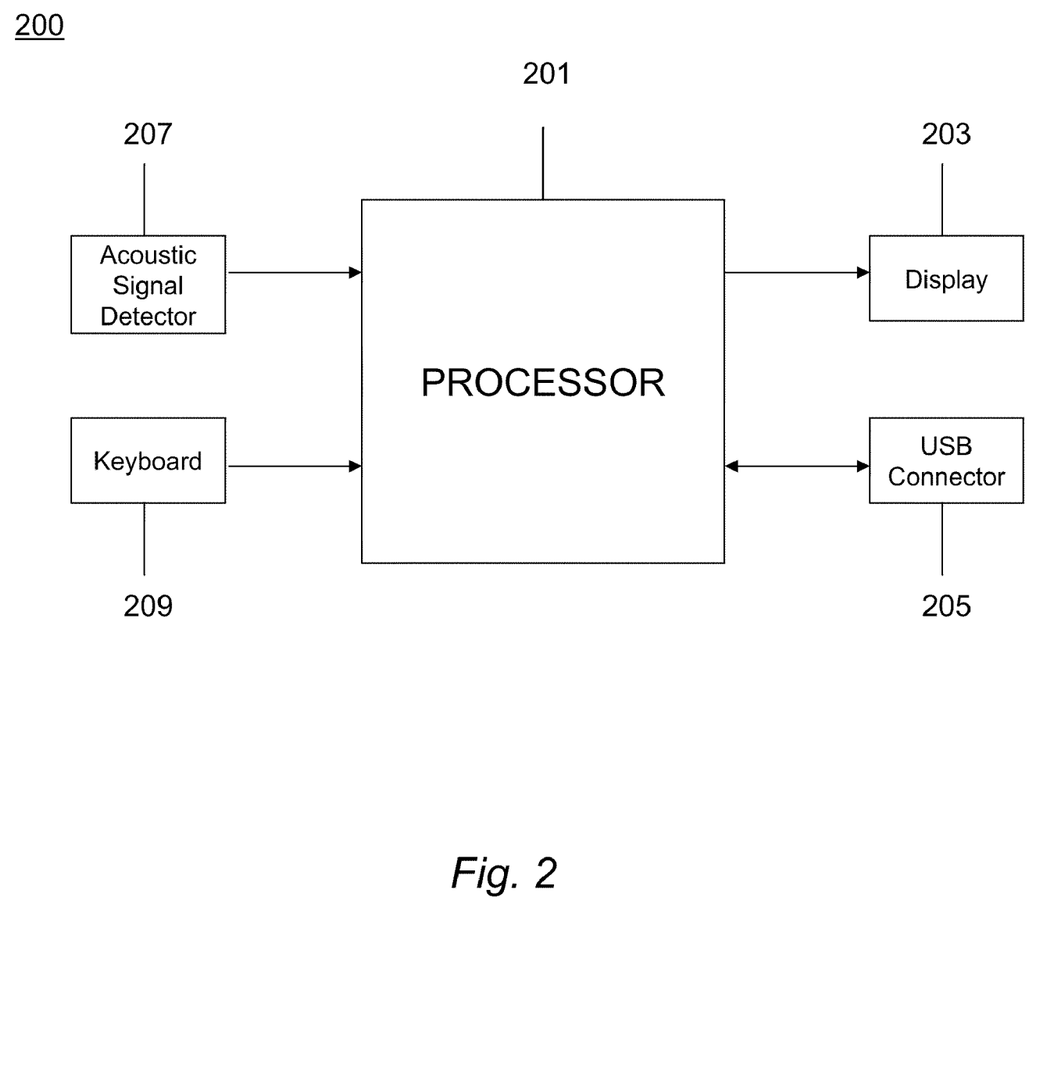
FIG. 2 is a block diagram of an example of a computer system adapted in accordance with an embodiment.

Each user 105 may be provided with a way to detect the acoustic signal (e.g. by way of a dedicated device coupled to the phone used for the connection to the call) and monitoring the up to date list of current participants. This can be a dedicated small portable HW device which can be coupled to the caller phone. As represented in FIG. 2 this device 200 may include a processor 201, a display 203 for showing the list of participants to the caller; a USB connector 205 for connecting the device 200 to the phone or to a PC; and a detector 207 for the acoustic signals for detecting the acoustic signal issued from the server. There may also be a keyboard 209. A storage device means may also be included in processor 201 for maintaining necessary information, e.g. the list of subscribed participants and the corresponding associated acoustic signals. Each time a participants enters the call, the Conference Call Server 101 may provide to all the participants the related corresponding tone. Because the HW device 200 can be able to distinguish between the different tones and hold the list of participants, each remote location may be able to understand who can be on even if one of the participants dials in when the call has already started. When a participant dials in to the conference call facility system, the facility system may provide to him a tone for each of the participants that have already dialled in, and the facility system may provide his tone to each of the other participants, and the participants list may be updated accordingly in all connected devices. In order to access a conference call, participants me be requested to dial in the number of a conferencing call system facility and to provide a conference id (to identify the call they would like to join) and optionally a pass code associated to it (to secure the access). Once the caller is authenticated and identified, the conferencing system may be ready to let him join the call (by switching the connection) and may announce with a tone signal to all the participants already in the call, the new participant joining, a new additional action may be performed: if the participant accessing is not the first one joining, the conferencing system facility may send him all the specific signal tones (according to the defined association participants-signals) for each of the participants that have already previously joined the conference system. The new participant may gain access to the conference and his specific tone signal may be sent to all the other participants.

As mentioned above the way each user interacts with the central Server 101 does not need to be through a separate device. The components described with reference to FIG. 2 could be embedded in a phone (e.g. a mobile smart phone or a phone with loudspeaker which is normally used in meeting rooms). Some modern phones already have these components included in their HW. In such case suitable SW can be set up to enable the phone to have this functionality. An external device with limited weight and dimensions can also be useful for providing advanced capability of interacting with the Central Server 101 to users without smart phones or needing to connect to the conference call from e.g. public phones.

Figure 3:
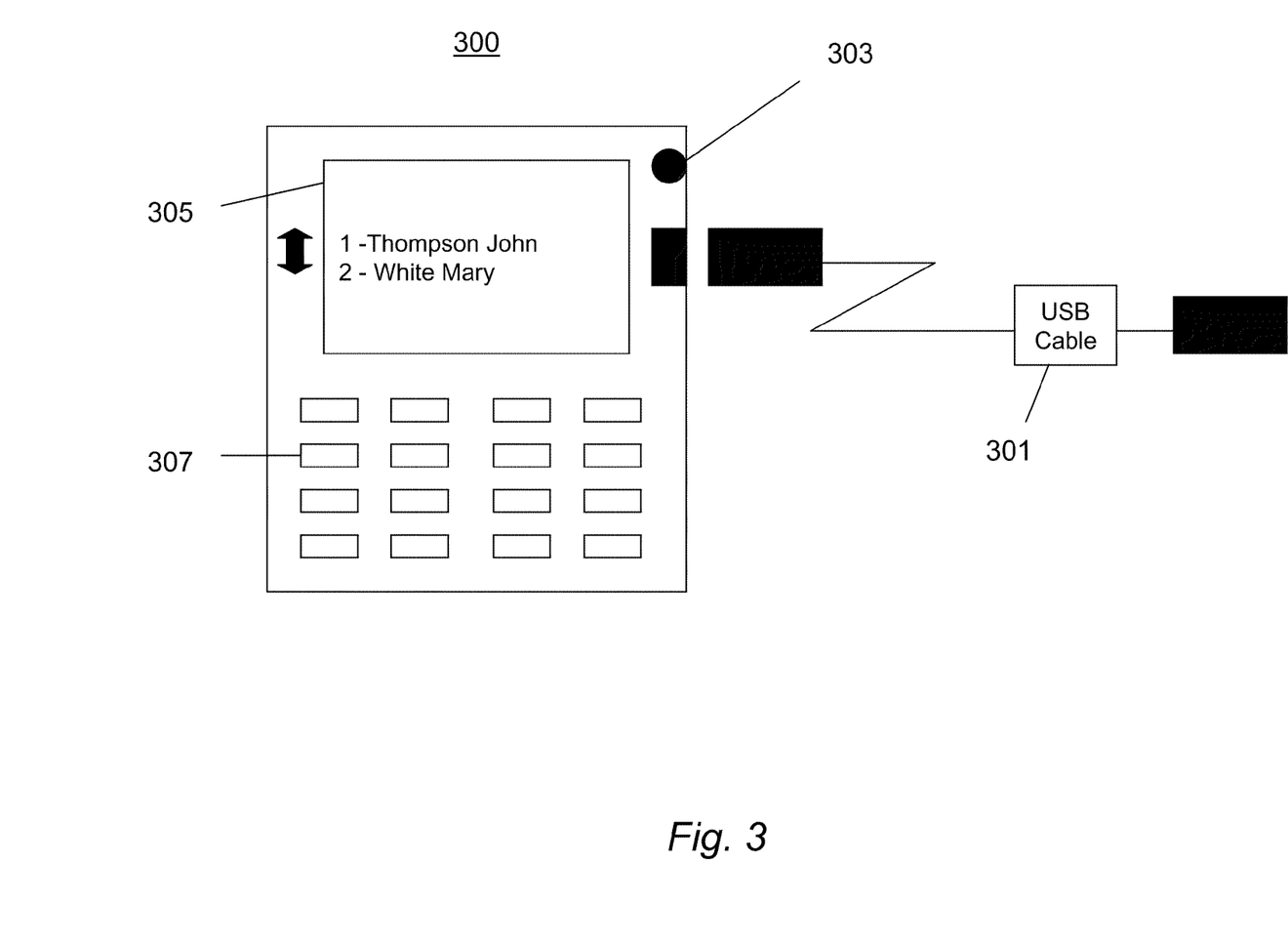
FIG. 3 is an example of a device according to an embodiment.

FIG. 3 shows an example of a device 300 according to an embodiment of the invention: a connection 301 (e.g. a USB cable) may be used to enable communication between the device 300 and a phone used by the user 105 (not shown) to join the conference call; a microphone 303 may detect acoustic signals received by the Central Server 101; a display 305 may show the user 105 the up to date participants list. Such list may be determined by comparing the detected acoustic signal with the predetermined list of participants and corresponding acoustic signals, previously stored in the device 300. The association caller/acoustic signal may be based on a predetermined order, e.g. the order on the invitation Email and it may be shared by the Server 101 and those connected users 105 wishing to exploit this functionality. It is understood that those connected users without the necessary device or without an enabled phone may not notice any differences from the usual way of connecting: they will simply listen to usual "connecting tones" every time a new user joins the call. The only difference may be that a different tone can be used per each user, but this may not be a problem to anyone, and may not even be perceived. In an embodiment, the order of the available acoustic signal set may be fixed such that the association can be first with first, second with second and so on. This may be known to all the portable devices that map the same acoustical signal set, for recognition. The predetermined participants list (available to the conferencing system) could be entered in the portable device before the start of the conference call by connecting the device to a computer (or to a PDA or a mobile phone) through the connection 303 or alternatively by means of an optional keyboard 307. As mentioned before any kind of order can be acceptable and the order could even change, provided the up to date association user/tone may be known by each authorized user.

Figure 4:
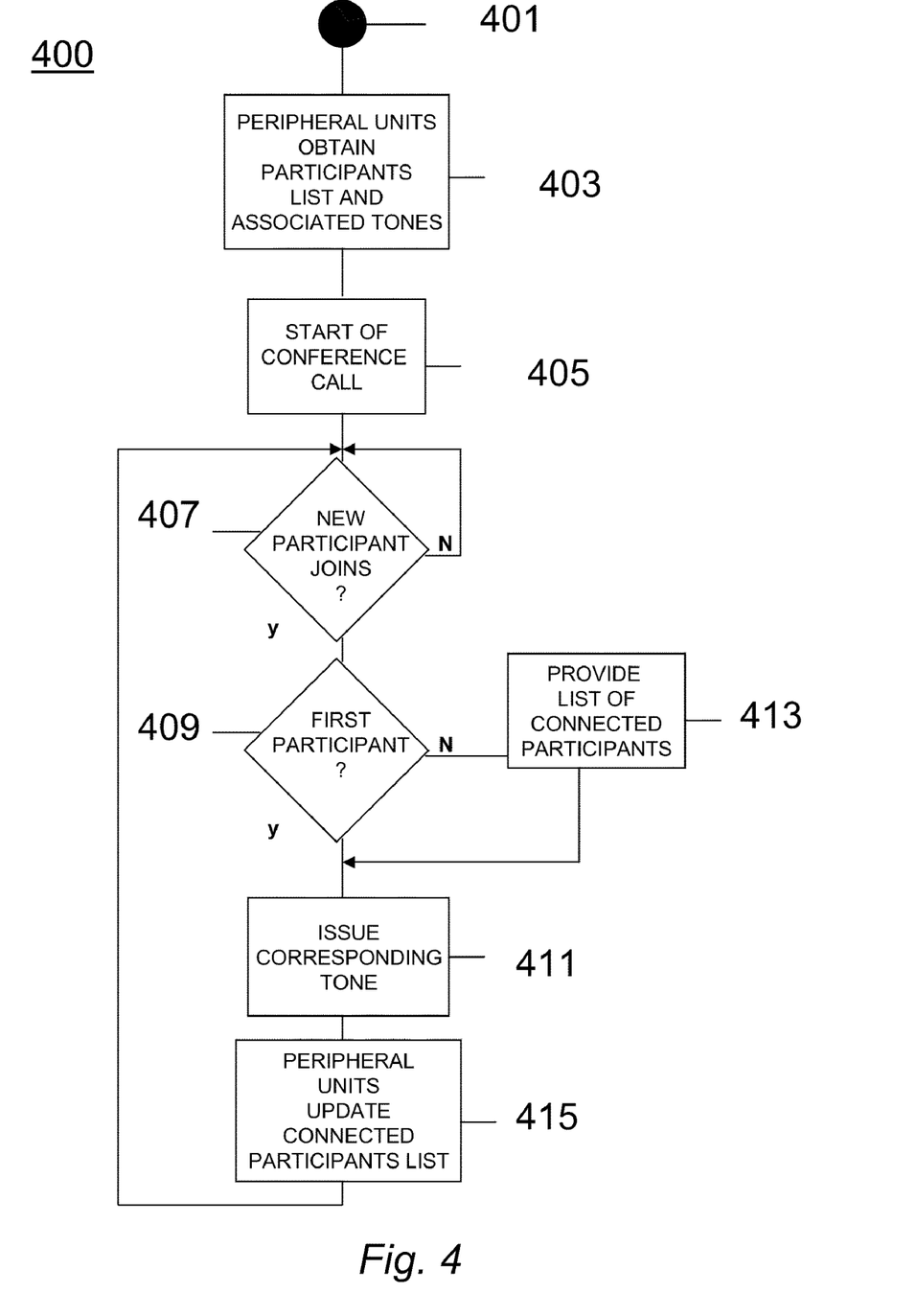
FIG. 4 is a flowchart of the method of an embodiment.

Referring to FIG. 4, an example of the method 400 is described. The method may start at black circle 401 and proceed to box 403 where peripheral units (associated to users 105 of FIG. 1) obtain the list of participants (e.g. from the Email Server 109). In this list, each subscribed participant may have an associated tone. The form of the list can vary according to the agreement between the Server and the peripheral units; e.g. it could transmit a complete table with all the information about the corresponding tones or it could be agreed that a standard tone can be associated to each participant according to the corresponding position on the list. At step 405 the Conference Call may be started by the user who had set up the call (the call moderator). Every time a new user joins (step 407), he may authenticate himself with the Server 101 and, if the authentication is confirmed, the Server may check whether the user is the first one (step 409). In case it is the first user, the Server may issue the corresponding tone to all connected users (step 411), which in this case it is only the call moderator. In other cases, the Sever may provide the new user with a list of already connected users (step 413) before sending the corresponding tone to all connected users (step 411). The peripheral units may update the information on the local device in order to provide correct information to the associated user 105 (step 415). In an embodiment, an additional step (not shown in FIG. 4) could be added such that, when a user disconnects from the conference call another signal may be issued by the server to advise all connected users that someone has left. A simple way of implementing this feature could be to issue the same acoustic tone used when the same such user had joined; the peripheral units may update the list accordingly. In other words each time an acoustic tone can be received by the peripheral units, the status (connected or disconnected) of the corresponding user may be modified. It is understood that other ways of communicating this status change could be used instead such as, for example, issuing a different acoustic tone.

Figure 5:
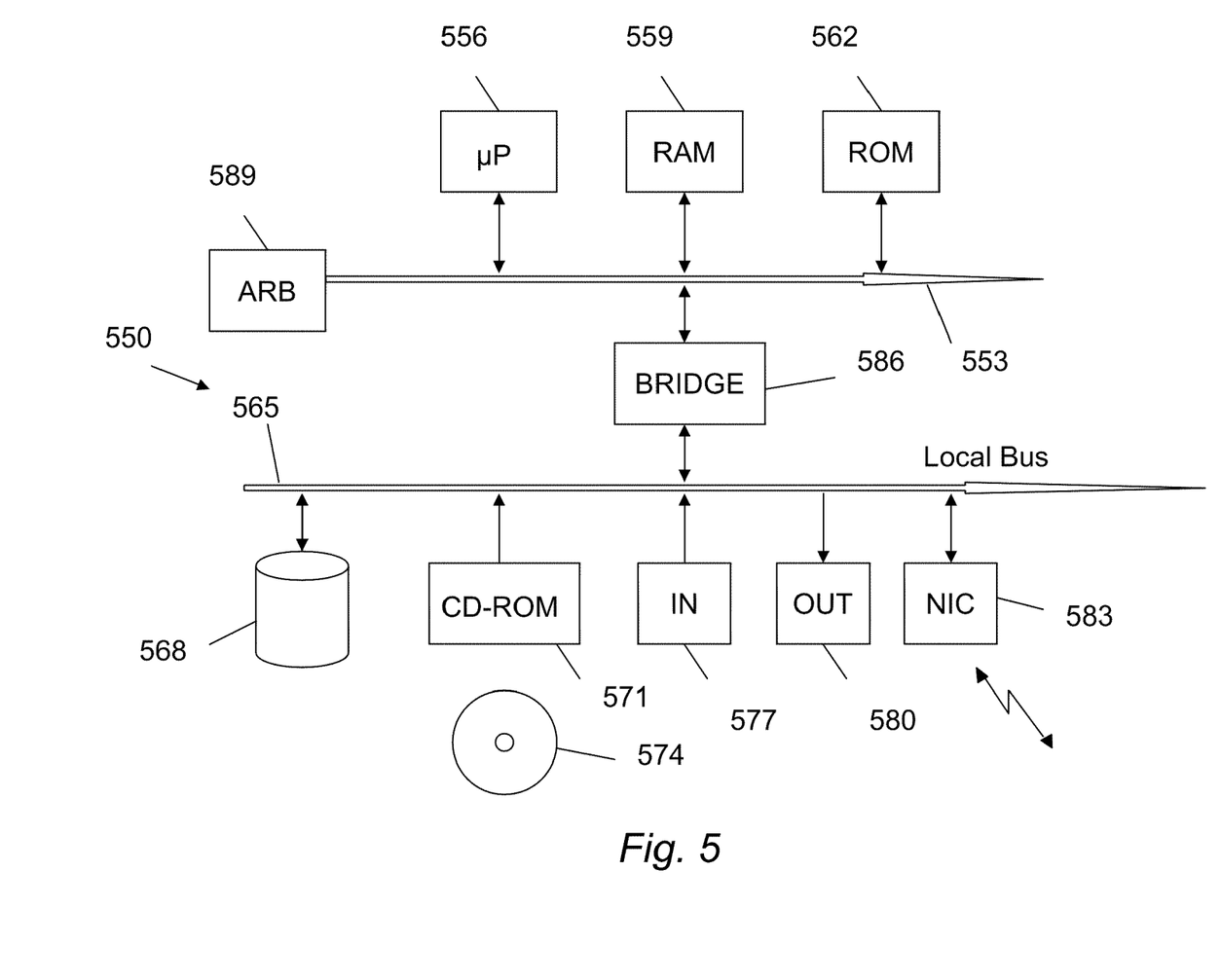
FIG. 5 shows the functional blocks of a generic computer of the system according to an embodiment.

As shown in FIG. 5, an example of a generic computer of the system (e.g. computer, Conference Call server, Email Server, peripheral unit, phones, router) is denoted with 550. The computer 550 may be formed by several units that are connected in parallel to a system bus 553. In detail, one or more microprocessors 556 may control operation of the computer 550; a RAM 559 may be directly used as a working memory by the microprocessors 556, and a ROM 562 may store basic code for a bootstrap of the computer 550. Peripheral units may be clustered around a local bus 565 (by way of respective interfaces). Particularly, a mass memory may include a hard-disk 568 and a drive 571 for reading CD-ROMs 574. Moreover, the computer 550 may include input devices 577 (for example, a keyboard and a mouse), and output devices 580 (for example, a monitor and a printer). A Network Interface Card 583 may be used to connect the computer 550 to the network. A bridge unit 586 may interface the system bus 553 with the local bus 565. Each microprocessor 556 and the bridge unit 586 may be able to operate as master agents requesting an access to the system bus 553 for transmitting information. An arbiter 589 may manage the granting of access with mutual exclusion to the system bus 553. Similar considerations apply if the system has a different topology, or it can be based on other networks. Alternatively, the computers may have a different structure, include equivalent units, or include other data processing entities (such as PDAs, mobile phones, and the like).

Embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

The invention claimed is:

1. A method comprising:
   starting a conference call in a system that includes a server coupled to a plurality of peripheral units;
   providing, by the server, an acoustic tone indicative of the identity of a new participant to at least one of the peripheral units in response to the new participant joining the conference call; and
   updating a list of currently called-in participants to indicate that the new participant has joined the conference call in response to detecting the acoustic tone.

2. The method of claim 1, further comprising:
   transmitting the list of currently called-in participants to at least one of the participants;
   wherein the acoustic tone is transmitted from the server to said at least one of the peripheral units in a format configured to be recognized by said at least one of the peripheral units.

3. The method of claim 2, wherein the transmission of the list is done using acoustic tones issued by the server.

4. The method of claim 2, further comprising:
   transmitting an acoustic tone to at least one of the peripheral units indicating that a participant has left the conference call in response to one of the participants leaving the conference call.

5. The method of claim 1, wherein each participant is associated with a predetermined acoustic tone.

6. The method of claim 1, wherein at least one of the peripheral units displays the list of currently called-in participants.

7. The method of claim 2, wherein the new participant is the at least one of the participants.

8. The method of claim 1, further comprising:
   providing said at least one of the peripheral units with software configured to recognize the acoustic tone.

9. A computer program product comprising:
   a non-transitory computer-readable medium including:
   computer program instructions for starting a conference call in a system that includes a server coupled to a plurality of peripheral units;
   computer program instructions for providing, by the server, an acoustic tone indicative of the identity of a new participant to at least one of the peripheral units in response to the new participant joining the conference call; and
   computer program instructions for updating a list of currently called-in participants to indicate that the new participant has joined the conference call in response to detecting the acoustic tone.

10. The computer program product of claim 9, wherein the non-transitory computer-readable medium further comprises:
    computer program instructions for transmitting the list of currently called-in participants to at least one of the participants;
    wherein the acoustic tone is transmitted from the server to said at least one of the peripheral units in a format configured to be recognized by said at least one of the peripheral units.

11. The computer program product of claim 10, wherein the non-transitory computer-readable medium further comprises:
    computer program instructions wherein the transmission of the list is done using acoustic tones issued by the server.

12. The computer program product of claim 10, wherein the non-transitory computer-readable medium further comprises:
    computer program instructions transmitting an acoustic tone to at least one of the peripheral units indicating that a participant has left the conference call in response to one of the participants leaving the conference call.

13. The computer program product of claim 9, wherein the non-transitory computer-readable medium further comprises:
    computer program instructions wherein each participant is associated with a predetermined acoustic tone.

14. The computer program product of claim 9, wherein the non-transitory computer-readable medium further comprises:
    computer program instructions wherein at least one of the peripheral units displays the list of currently called-in participants.

15. The computer program product of claim 10, wherein the non-transitory computer-readable medium further comprises:
    computer program instructions wherein the new participant is the at least one of the participants.

16. The computer program product of claim 9, wherein the non-transitory computer-readable medium further comprises:
    providing said at least one of the peripheral units with software configured to recognize the acoustic tone.

17. A system comprising:
    a processor; and
    a computer memory operatively coupled to the processor;
    wherein the computer memory has disposed within it:
    computer program instructions for starting a conference call in a system that includes a server coupled to a plurality of peripheral units;
    computer program instructions for providing, by the server, an acoustic tone indicative of the identity of a new participant to at least one of the peripheral units in response to the new participant joining the conference call; and
    computer program instructions for updating a list of currently called-in participants to indicate that the new participant has joined the conference call in response to detecting the acoustic tone.

18. The system of claim 17, wherein the computer memory further has disposed within it:
    computer program instructions for transmitting the list of currently called-in participants to at least one of the participants;
    wherein the acoustic tone is transmitted from the server to said at least one of the peripheral units in a format configured to be recognized by said at least one of the peripheral units.

19. The system of claim 18, wherein the computer memory further has disposed within it:
    computer program instructions wherein the transmission of the list is done using acoustic tones issued by the server.

20. The system of claim 18, wherein the computer memory further has disposed within it:
    computer program instructions transmitting an acoustic tone to at least one of the peripheral units indicating that a participant has left the conference call in response to one of the participants leaving the conference call.

21. The system of claim 17, wherein the computer memory further has disposed within it:
- computer program instructions wherein each participant is associated with a predetermined acoustic tone.

22. The system of claim 17, wherein the computer memory further has disposed within it:
- computer program instructions wherein at least one of the peripheral units displays the list of currently called-in participants.

23. The system of claim 17, wherein the computer memory further has disposed within it:
- computer program instructions for providing said at least one of the peripheral units with software configured to recognize the acoustic tone.

\* \* \* \* \*